United States Patent
Reina et al.

(10) Patent No.: US 11,783,127 B2
(45) Date of Patent: Oct. 10, 2023

(54) DATA ENTRY FEATURE FOR INFORMATION TRACKING SYSTEM

(71) Applicant: Zinatt Technologies, Inc., Tucson, AZ (US)

(72) Inventors: Gabriel Enrique Reina, Tucson, AZ (US); David Hirschfeld, Scottsdale, AZ (US)

(73) Assignee: ZINATT TECHNOLOGIES, INC., Tucson, AZ (US)

( * ) Notice: Subject to any disclaimer, the term of this patent is extended or adjusted under 35 U.S.C. 154(b) by 656 days.

(21) Appl. No.: 16/969,420

(22) PCT Filed: Aug. 7, 2020

(86) PCT No.: PCT/US2020/045353
§ 371 (c)(1),
(2) Date: Aug. 12, 2020

(87) PCT Pub. No.: WO2021/026428
PCT Pub. Date: Feb. 11, 2021

(65) Prior Publication Data
US 2023/0141184 A1    May 11, 2023

Related U.S. Application Data

(60) Provisional application No. 62/883,917, filed on Aug. 7, 2019.

(51) Int. Cl.
*G06F 40/279* (2020.01)
*G06F 16/242* (2019.01)
(Continued)

(52) U.S. Cl.
CPC .......... *G06F 40/279* (2020.01); *G06F 16/243* (2019.01); *G06F 40/117* (2020.01); *G06V 30/10* (2022.01)

(58) Field of Classification Search
CPC .... G06F 40/279; G06F 16/243; G06F 40/117; G06F 16/34; G06F 40/295; G06F 40/284; G06V 30/10
(Continued)

(56) References Cited

U.S. PATENT DOCUMENTS

2012/0150866 A1    6/2012  Miller
2013/0144863 A1    6/2013  Mayer et al.

FOREIGN PATENT DOCUMENTS

CN    102567365 A    7/2012
CN    105550298 A    5/2016
(Continued)

*Primary Examiner* — Thierry L Pham
(74) *Attorney, Agent, or Firm* — Faegre Drinker Biddle & Reath LLP

(57) ABSTRACT

A method for processing text data includes analyzing the text data to identify a plurality of keywords. The method also includes determining whether each of the plurality of keywords already exists in one or more databases. When a keyword in the plurality of keywords is not found in the one or more databases, the method includes tagging the keyword with a plurality of characters for storage. The plurality of characters includes at least a first character to indicate a start of the tagging, a second character to indicate a corresponding database for storing the keyword, and a third character to indicate an end of the tagging. The method also includes storing the tagged keyword in the corresponding database.

20 Claims, 10 Drawing Sheets

(51) Int. Cl.
*G06F 40/117* (2020.01)
*G06V 30/10* (2022.01)

(58) Field of Classification Search
USPC ............................................................ 704/9
See application file for complete search history.

(56) References Cited

FOREIGN PATENT DOCUMENTS

| | | |
|---|---|---|
| WO | 99/34307 A1 | 7/1999 |
| WO | 2017/097075 A1 | 6/2017 |

Call 345
TT# 2
Outgoing: 399-930-3094

Jessie to Marco  510    512

Parties greeted. Jessie told Marcos that they had gone to the store yesterday but didn't see anyone that could buy the /~ gringos^ 502 (referring to marijuana) Jessie assured Marco they had to get someone to help them sell on the streets in order for them to make progress. Marco said he knew a guy by the name of /~ Rob^ 504 that was good at it but had been recently taken in (to jail) and they would need to wait until things calm down again before they can approach him about working with them.

Marco told Jessie he just found someone and asked Jessie to meet him at /~ad 473 W Nora Blvd^ 506 so they can talk about it and go from there. Both parties agreed to meet at set location. Marco told Jessie he would be driving the /~ ████ ^ 508 and told Jessie to park on the road and not the drive way since it wasn't his house.

Parties agreed to talk later.

FIG. 5

Robert told Maria to meet him at 475 W Nora Blvd in 40 minutes.

Marco to Jessie

Parties greeted. Marco told Jessie the people from the /ns office\ would be meeting /sp tomorrow\ Jessie said he wouldn't be able to make it since he had to work until 5pm. Marco told Jessie the meeting wasn't until 8pm and his attendance was required. Jessie affirmed he would be able to make it and both agreed to meet at the /sd ▓▓▓\ at 4:30pm. Both agreed to see each other later.

DATA ENTRY FEATURE FOR INFORMATION TRACKING SYSTEM

CROSS-REFERENCE TO RELATED APPLICATIONS

The present application is a 371 U.S. National Phase of International Application No. PCT/US2020/045353, filed Aug. 7, 2020, which claims the benefit of priority to U.S. Provisional Application No. 62/883,917, filed on Aug. 7, 2019, the entire disclosure of which is hereby expressly incorporated herein by reference.

FIELD OF THE DISCLOSURE

The present disclosure generally relates to information tracking, and more particularly to systems and methods for processing data entries for investigative information tracking.

BACKGROUND OF THE DISCLOSURE

Current investigations and reports by law enforcement are typically manually processed by using conventional word processing and/or spreadsheet programs. However, such system lacks the ability to efficiently manage and integrate the information into a database. For example, a drug trafficking investigation may have a large amount of uncategorized or untagged data that needs to be preprocessed before storage in the database. Conventional methods require extensive man-hours to sort and clean up the various entries, which may be prone to errors. Due to the nature of some errors, opportunities to gather more evidence, prevent further crimes, and apprehend suspects can be frustrated. Therefore, a need exists to better process and manage the data obtained during the course of an investigation.

SUMMARY

According to one embodiment, the present disclosure provides a method by a computing device for processing text data associated with an investigation. The method includes analyzing the text data to identify a plurality of keywords. The method also includes determining whether each of the plurality of keywords exists in one or more databases. When a keyword in the plurality of keywords is not found in the one or more databases, the method includes tagging the keyword with a plurality of characters for storage. The plurality of characters includes at least a first character to indicate a start of the tagging, a second character to indicate a corresponding database for storing the keyword, and a third character to indicate an end of the tagging.

In a further aspect, the plurality of characters includes one or more letters, numbers, punctuation marks, and special symbols found on a keyboard. Each of the first, second, and third characters can have than one character. The second character is intermediate the first character and the third character, while the keyword is intermediate the second character and the third character.

In another aspect, the method includes highlighting the tagged keyword with a first color to indicate that user input is needed to add information about the tagged keyword. When the tagged keyword includes two or more separate words, the method includes highlighting the tagged keyword with a second color to indicate that user input is needed to classify the two or more separate words. When the keyword in the plurality of keywords is found in the one or more databases, the method includes highlighting the keyword with a third color to indicate that the keyword already exists. Moreover, the method includes storing the tagged keyword in the corresponding database. The tagged keyword can also be stored in multiple databases.

According to another embodiment, the present disclosure provides a system for processing text data associated with an investigation. The system includes a processor, a memory, and one or more databases. The memory includes instructions that, when executed by the processor, cause the processor to analyze the text data to identify a plurality of keywords. The processor also determines whether each of the plurality of keywords exists in the one or more databases. When a keyword in the plurality of keywords is not found in the one or more databases, the processor tags the keyword with a plurality of characters for storage. The plurality of characters includes at least a first character to indicate a start of the tagging, a second character to indicate a corresponding database for storing the keyword, and a third character to indicate an end of the tagging.

In a further aspect, the plurality of characters includes one or more letters, numbers, punctuation marks, and special symbols found on a keyboard. Each of the first, second, and third characters can have than one character. The second character is intermediate the first character and the third character, while the keyword is intermediate the second character and the third character.

In another aspect, the processor highlights the tagged keyword with a first color to indicate that user input is needed to add information about the tagged keyword. When the tagged keyword includes two or more separate words, the processor highlights the tagged keyword with a second color to indicate that user input is needed to classify the two or more separate words. When the keyword in the plurality of keywords is found in the one or more databases, the processor highlights the keyword with a third color to indicate that the keyword already exists. Moreover, the processor stores the tagged keyword in the corresponding database.

According to yet another embodiment, the present disclosure provides a non-transitory computer readable medium that has instructions stored thereon. The instructions, when executed by a processor, cause the processor to analyze text data to identify a plurality of keywords and determine whether each of the plurality of keywords exists in one or more databases. When a keyword in the plurality of keywords is not found in the one or more databases, the instructions cause the processor to tag the keyword with a plurality of characters for storage. The plurality of characters includes at least a first character to indicate a start of the tagging, a second character to indicate a corresponding database for storing the keyword, and a third character to indicate an end of the tagging. The instructions also cause the processor to store the tagged keyword in the corresponding database. The plurality of characters includes one or more letters, numbers, punctuation marks, and special symbols found on a keyboard.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein:

FIG. 5 is a conceptual diagram illustrating example processed data entries;

FIGS. 6-8 are conceptual diagrams illustrating example user interfaces for processed data entries; and FIGS. 9-10 are conceptual diagrams illustrating other examples of processed data entries.

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION

Figure 1:
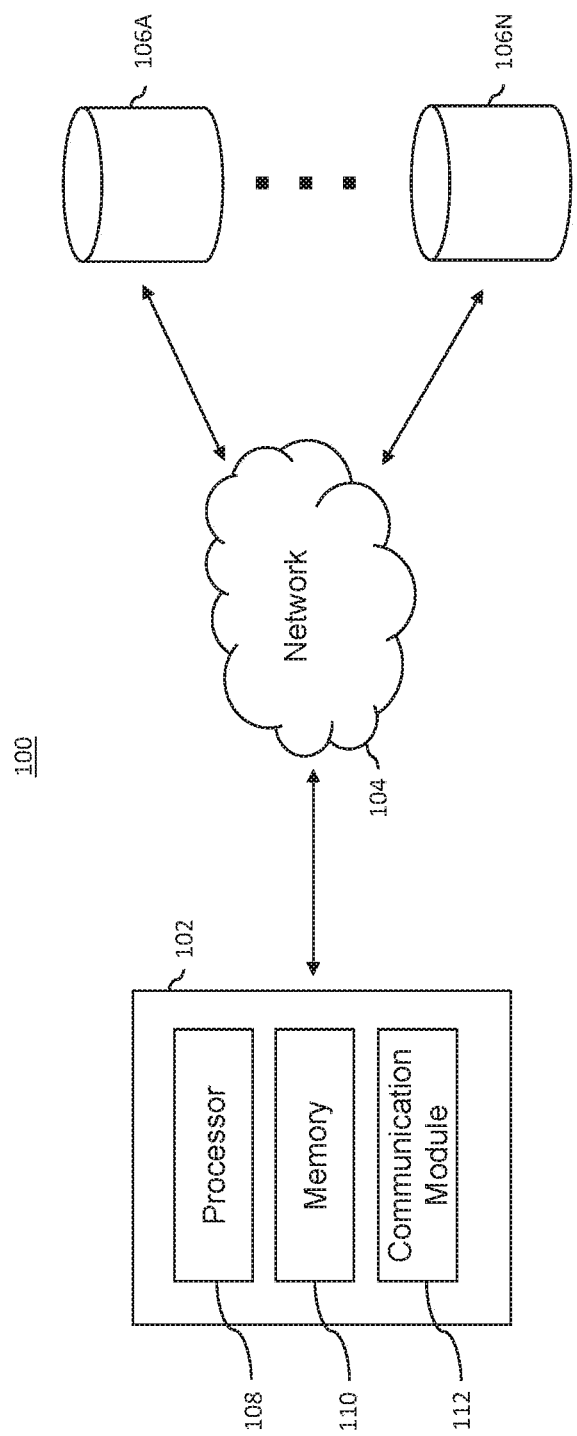
FIG. 1 is a block diagram illustrating an information tracking system.

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

One of ordinary skill in the art will realize that the embodiments provided can be implemented in hardware, software, firmware, and/or a combination thereof. Programming code according to the embodiments can be implemented in any viable programming language such as C, C++, HTML, XTML, JAVA or any other viable high-level programming language, or a combination of a high-level programming language and a lower level programming language.

FIG. 1 illustrates an information tracking system 100 that includes a computing device 102 (e.g., a desktop, a laptop, a mobile device, etc.) in communication, via a network 104 (e.g., local area network, wide area network, the Internet, etc.), with one or more databases 106A-106N implemented on non-transitory, computer-readable storage mediums (e.g., servers). Databases 106A-106N are configured to store data associated with an investigation. The investigation may be related to law enforcement (e.g., drug transfers, money laundering, wire fraud, identity theft, etc.), although other types of investigation (e.g., employment issues) or other non-investigation are also contemplated. While FIG. 1 shows databases 106A-106N as being separate units, in other embodiments, databases 106A-106N may be implement as a single unit. Additionally, in the present disclosure, database may include tables of information stored in any suitable manner, storage locations of data, or storage locations within the present system. Any type of accessible storage architecture is contemplated by the present disclosure.

Computing device 102 includes a processor 108 (e.g., a microprocessor, a microcontroller, logic circuitry, etc.), a memory 110, and a communication module 112. Processor 108 is configured to receive and process the data associated with the investigation. Processing the data entails categorizing or tagging the data for storage in databases 106A-106N. Once processed, computing device 102 can transmit the data to databases 106A-106N using communication module 112 via network 104. Processor 108 is also configured to analyze the data and generate an investigative report based on the analysis. While not shown, computing device 102 may include additional components (e.g., input/output devices) used for operating computing device 102.

A user, operating computing device 102, can access databases 106A-106N to retrieve, save, and/or modify the data stored therein. The data may include information such as personal identification information (e.g., names), location information (e.g., addresses), vehicle information, property information, financial information, and any other relevant information associated with the investigation. In one embodiment, the data may be in the form of text data (e.g., an email, a text message, a transcription of an audio file, a letter, etc.). In other embodiments, the data may be metadata which may or may not be viewable by the user.

Figure 2:
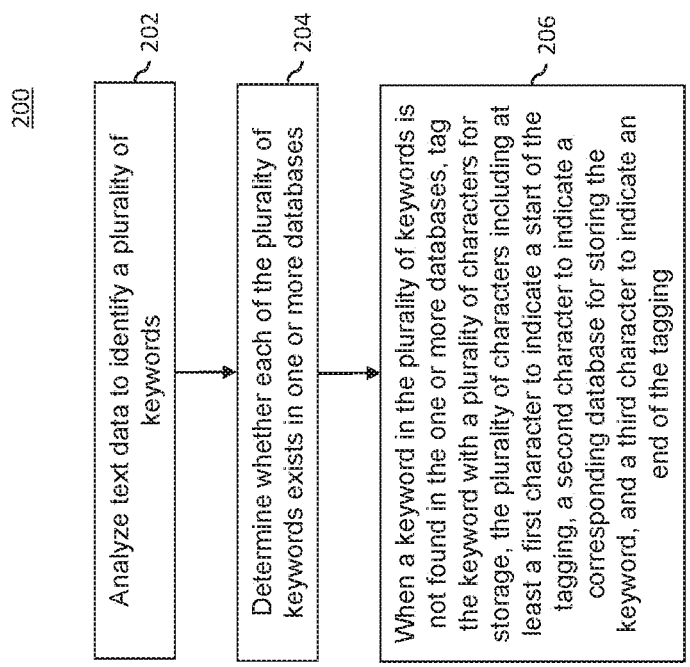
FIG. 2 is a flow chart illustrating a method of processing data entries for the information tracking system of FIG. 1.

Referring now to FIG. 2, a method 200 of processing text data associated with an investigation is shown. Method 200 can be performed by computing device 102. At block 202, computing device 102 receives and analyzes the text data to identify a plurality of keywords. Keywords can be identified based on comparisons to stored terms. For example, computing device 102 can identify keywords related to a vehicle when words in the text data mention a particular vehicle make or model. As another example, computing device 102 can identify keywords related to an event when words in the text data mention a date, a time of day, a day of the week, etc. In still another example, computing device 102 can identify keywords based on special symbols, such as recognizing an email based on the "A" symbol.

At block 204, computing device 102 determines whether each of the plurality of keywords exists in one or more databases (e.g., databases 106A-106N). In particular, computing device 102 can perform a search of databases 106A-106N to determine if an identified keyword is already present in any of databases 106A-106N.

Figure 3:
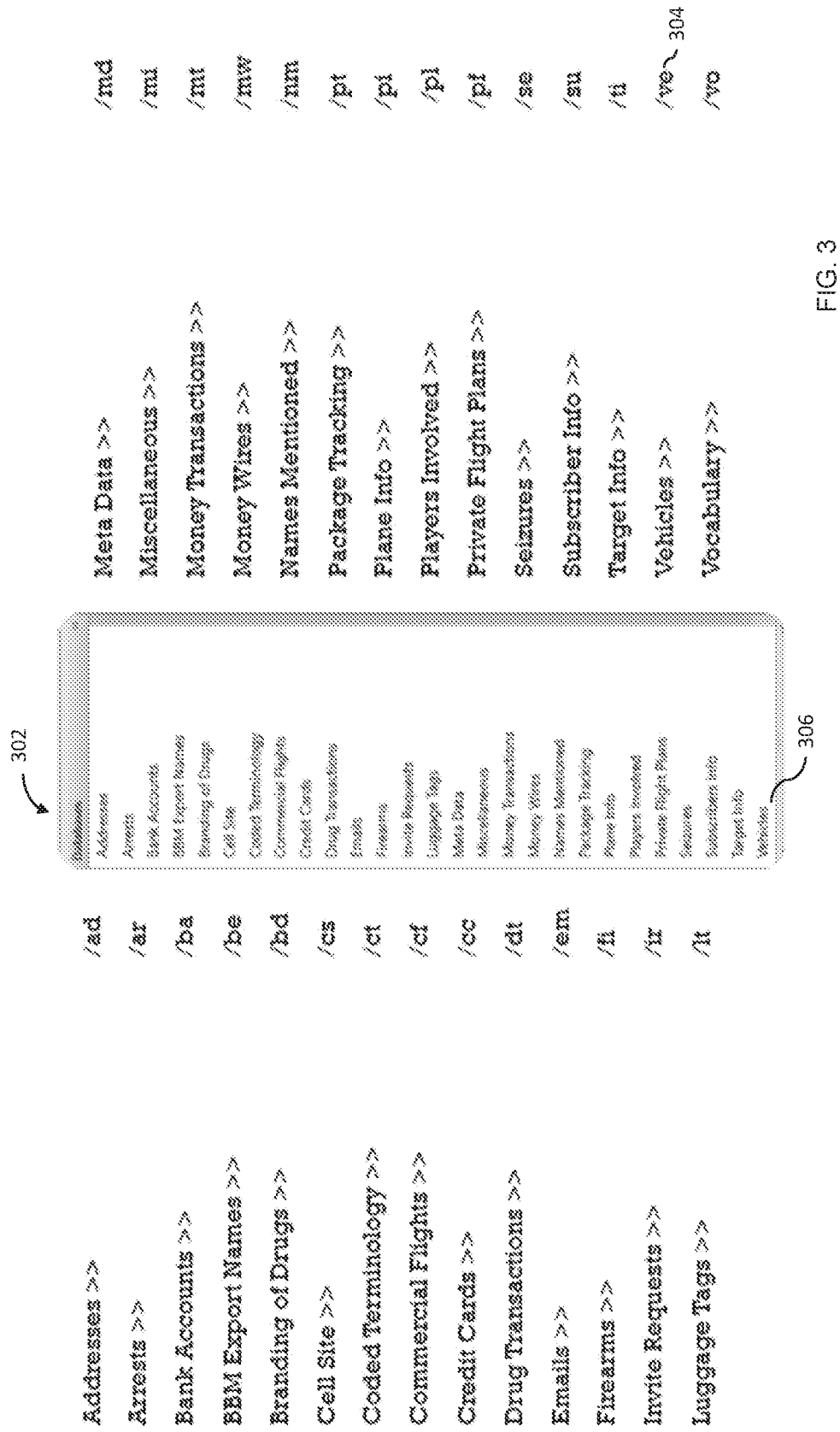
FIG. 3 is a conceptual diagram illustrating various example databases.

At block 206, when the keyword not found in any of databases 106A-106N, computing device 102 tags the keyword with a plurality of characters for storage in a particular database. FIG. 3 lists various example databases 302 that the keyword can be saved to. For example, if the keyword is related to a vehicle, then the keyword can be tagged with a character ("ye") 304 for storage in a vehicles database ("Vehicles") 306. In one embodiment, each of database 302 can be implemented as one of databases 106A-106N of FIG. 1.

Figure 4:
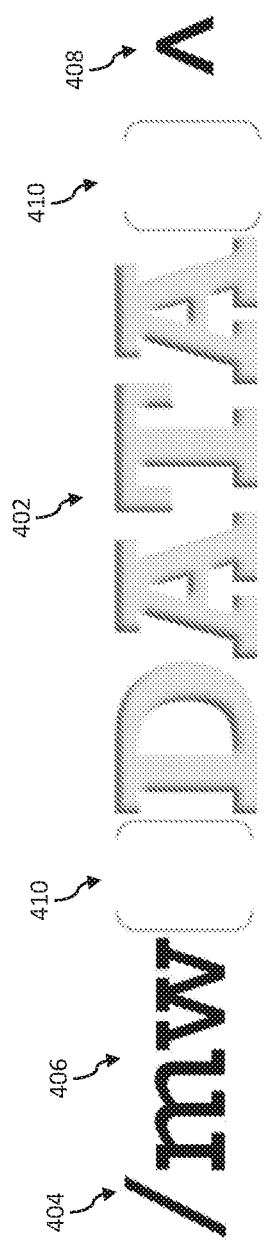
FIG. 4 is a conceptual diagram illustrating an example format for processing data entries.

The plurality of characters used to tag the keyword includes at least a first character to indicate a start of the tagging, a second character to indicate a corresponding database for storing the keyword, and a third character to indicate an end of the tagging. Each of the first, second, and third characters may include more than one character. As an illustration, FIG. 4 shows an example format for tagging a keyword represented by data 402. A first character 404, in the form of a forward slash symbol ("/"), is used to indicate the start of the tagging. A second character 406, in the form of two letters ("mw"), is used to indicate a specific database that data 402 should be saved to. In this example, the letters "mw" stand for "Money Wires," which is the name of a database used to store information related to money wirings. A third character 408, in the form of a caret symbol ("^"), is used to indicate the end of the tagging. One or more blank spaces 410 may exist before and/or after data 402. In this manner, second character 406 is intermediate first character 404 and third character 408, while data 402 (or keyword) is intermediate second character 406 and third character 408. It should be noted that the tagging format is not limited to the illustration shown in FIG. 4 as other formats may be contemplated in other embodiments. For example, a keyword may be saved to more than one database by including additional characters to indicate multiple databases. In general, the plurality of characters used for tagging a keyword can include any number and combination of letters, numbers, punctuation marks, and special symbols found on a standard keyboard.

Tagging keywords by computing device 102 allows the keywords to be accurately and efficiently stored in databases 106A-106N. This in turn enables easier information searching, information retrieval, information association, and information forecasting during the course of the investigation. In one embodiment, the tagging can be performed by a user.

FIG. 5 illustrates an example text data 500 that has been processed by computing device 102 to identify and tag keywords. Text data 500 may be a description of a phone call between two parties. When computing device 102 determines that a keyword is found to not exist in any of the databases (e.g., any of databases 106A-106N), that keyword is tagged for storage using a plurality of characters according to the format shown in FIG. 4. In FIG. 5, keywords 502-508 are tagged for storage. For example, keyword 502 is determined to be a slang word, and as such, keyword 502 is tagged to be stored in a "Vocabulary" database designated "vo." In another example, keyword 504 is determined to be a person's name, and as such, keyword 504 is tagged to be stored in a "Names Mentioned" database designated "nm." Other examples include keyword 506 tagged to be stored in an "Addresses" database designated "ad," and keyword 508 tagged to be stored in a "Vehicles" database designated "ye."

Figure 6:
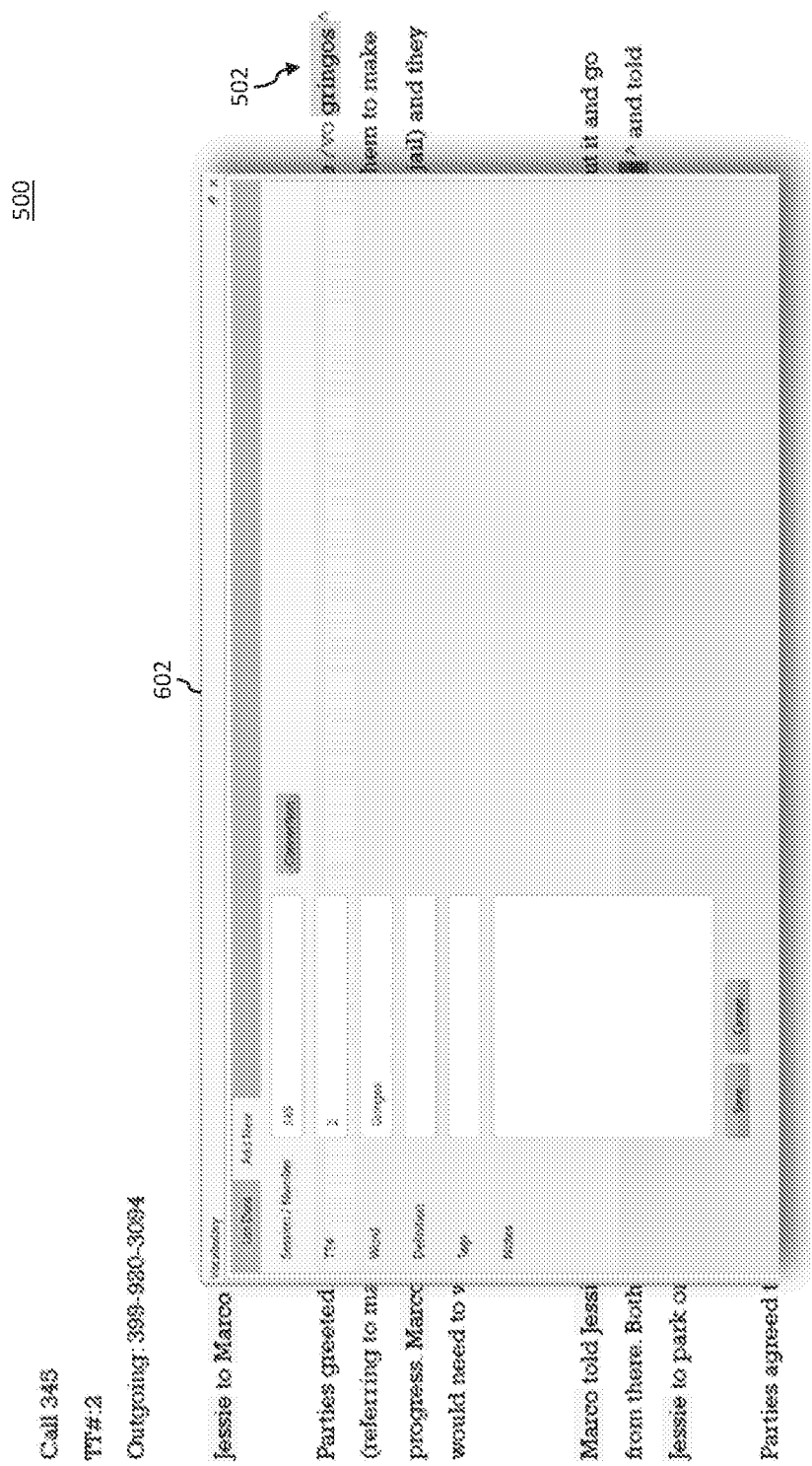

In some embodiments, a tagged keyword may require additional information to describe the keyword (e.g., from a user). As such, computing device 102 highlights the tagged keyword with a first color to indicate that user input is needed to add information about the tagged keyword. In FIG. 5, keyword 502 is highlighted with a green color to indicate additional user input. Referring to FIG. 6, an example user interface 602 is generated when a user selects (e.g., double-clicks on) keyword 502. User interface 602 is in the form of a data entry window that allows the user to enter information (e.g., definition, notes, etc.) for keyword 502.

Figure 7:
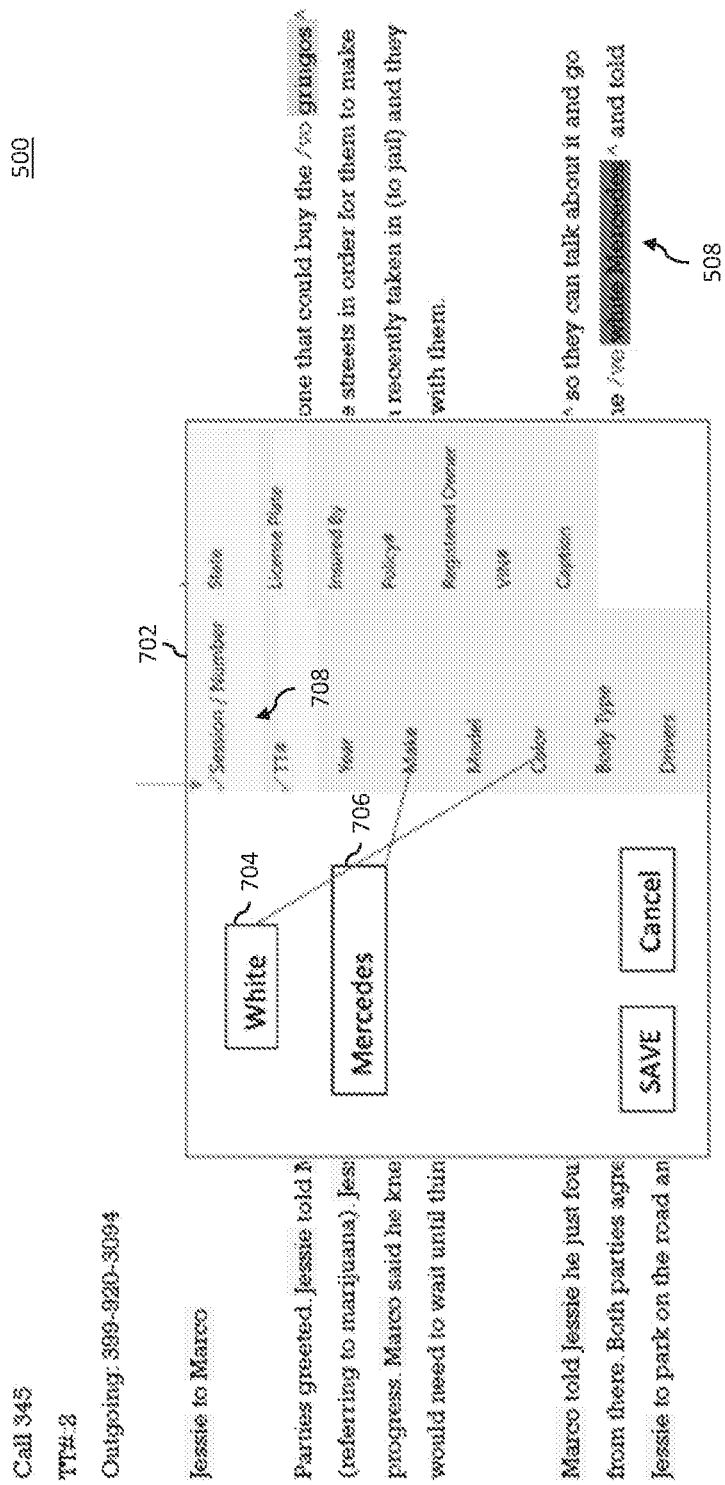

In some embodiments, a tagged keyword may comprise a combination of two or more separate words. As such, computing device 102 highlights the tagged keyword with a second different color to indicate that user input is needed to categorize or classify the two or more separate words. In FIG. 5, keyword 508 is highlighted with a red color to indicate additional user input. Keyword 508 includes two separate words 704, 706 that describe a color and a make of a vehicle, respectively. Referring to FIG. 7, an example user interface 702 is generated when a user selects (e.g., double-clicks on) keyword 508. User interface 702 is in the form of a mapping window that allows the user to match words 704, 706 to their corresponding descriptions. User interface 702 also includes labels 708 that indicate auto-populated related information. Once the user has successfully classified words 704, 706, computing device 102 may change the highlighting of keyword 508 to a different color (e.g., to a green color).

When computing device 102 determines that a keyword is found to exist in one of the databases (e.g., one of databases 106A-106N), that keyword is not tagged and is highlighted with a third color to indicate that the keyword already exists. For example, referring back to FIG. 5, keywords 510, 512 are highlighted in yellow to indicate that computing device 102 found these keywords in the databases.

When a keyword already exists, a user can also access information about that keyword. Referring to FIG. 8, an example user interface 802 is generated when a user chooses (e.g., double-clicks on) an already existing keyword 804. User interface 802 is in the form of a data entry window that allows the user to view and/or modify any of the information associated with keyword 804.

Figure 10:
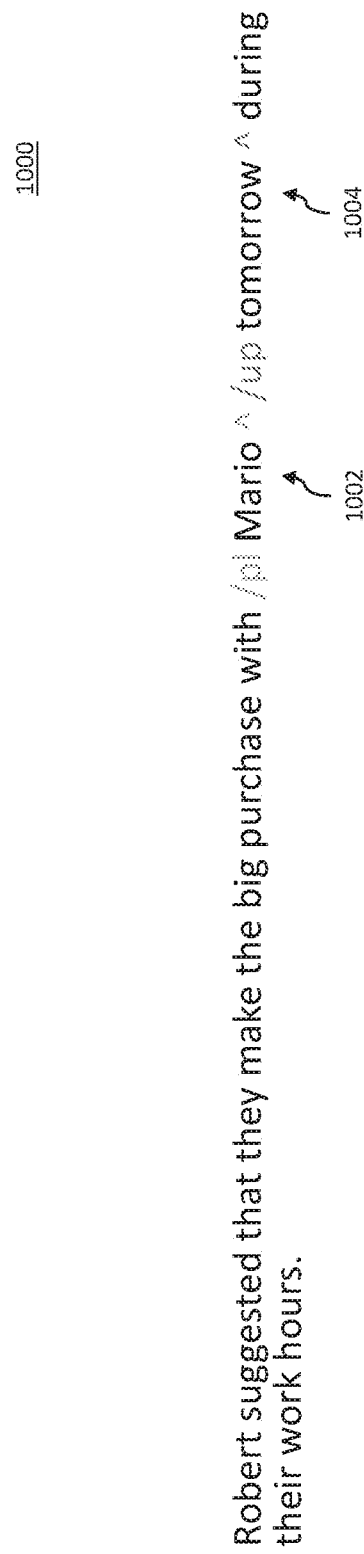

FIGS. 9-10 illustrate other examples of text data processed by computing device 102. In FIG. 9, text data 900 includes a tagged keyword 902 which is in the form of a phrase with multiple words. Tagged keyword 902 describes a place but without an actual address. As such, computing device 102 has highlighted tagged keyword 902 in red indicate that additional user input is required (e.g., to determine the actual address through a different source).

In some embodiments, computing device 102 can provisionally tag a keyword but will not activate it until or unless a user reviews the tagging. In FIG. 10, text data 1000 includes provisionally tagged keywords 1002, 1004. Computing device 102 has recognized the keywords but has not permanently tagged them. A user can review provisionally tagged keywords 1002, 1004, and upon selecting them (e.g., double-clicking), computing device 102 can activate their tagging by highlighting keywords 1002, 1004 in red. This also indicates that additional user input (e.g., information to describe the keywords) is needed.

In certain embodiments, text data 100 can be used to create an event. For example, when keyword 1004 is encountered during the data entry process described above, an event may be added to the system calendar by typing "/up tomorrow^" which corresponds to upcoming events/calendar event.

System and methods disclosed herein allow for improved efficiency in terms of processing and integrating data associated with an investigation into one or more databases. Such efficiencies can result in reduced man-hours and lower costs for the investigation. Moreover, such systems and methods may reduce data entry errors that are typically present with conventional systems and methods in the industry.

The various illustrative modules and logical blocks described in connection with the embodiments disclosed herein can be implemented or performed by a machine, such as a general-purpose processor (e.g., a microprocessor, a microcontroller, a state machine, etc.), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. Alternatively, the storage medium can be integral to the processor.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for processing text data comprising:
   analyzing, by a computing device, the text data to identify a plurality of keywords;
   determining, by the computing device, whether each of the plurality of keywords exists in one or more databases; and
   when a keyword in the plurality of keywords is not found in the one or more databases, tagging, by the computing device, the keyword with a plurality of characters for storage, the plurality of characters including at least a first character to indicate a start of the tagging, a second character to indicate a corresponding database for storing the keyword, and a third character to indicate an end of the tagging.

2. The method of claim 1, wherein the plurality of characters includes one or more letters, numbers, punctuation marks, and special symbols found on a keyboard.

3. The method of claim 1, wherein each of the first, second, and third characters comprises more than one character.

4. The method of claim 1, wherein the second character is intermediate the first character and the third character, and the keyword is intermediate the second character and the third character.

5. The method of claim 1, further comprising highlighting the tagged keyword with a first color to indicate that user input is needed to add information about the tagged keyword.

6. The method of claim 5, wherein the tagged keyword comprises two or more separate words, and the method further comprises highlighting the tagged keyword with a second color to indicate that user input is needed to classify the two or more separate words.

7. The method of claim 6, wherein when the keyword in the plurality of keywords is found in the one or more databases, highlighting the keyword with a third color to indicate that the keyword already exists.

8. The method of claim 1, further comprising storing the tagged keyword in the corresponding database.

9. The method of claim 1, wherein the tagged keyword is stored in multiple databases.

10. A system comprising:
    a processor;
    one or more databases; and
    a memory including instructions that, when executed by the processor, cause the processor to:
    analyze text data to identify a plurality of keywords;
    determine whether each of the plurality of keywords exists in the one or more databases; and
    when a keyword in the plurality of keywords is not found in the one or more databases, tag the keyword with a plurality of characters for storage, the plurality of characters including at least a first character to indicate a start of the tagging, a second character to indicate a corresponding database for storing the keyword, and a third character to indicate an end of the tagging.

11. The system of claim 10, wherein the plurality of characters includes one or more letters, numbers, punctuation marks, and special symbols found on a keyboard.

12. The system of claim 10, wherein each of the first, second, and third characters comprises more than one character.

13. The system of claim 10, wherein the second character is intermediate the first character and the third character, and the keyword is intermediate the second character and the third character.

14. The system of claim 10, wherein the instructions, when executed by the processor, further cause the processor to highlight the tagged keyword with a first color to indicate that user input is needed to add information about the tagged keyword.

15. The system of claim 14, wherein the tagged keyword comprises two or more separate words, and the instructions, when executed by the processor, further cause the processor to highlight the tagged keyword with a second color to indicate that user input is needed to classify the two or more separate words.

16. The system of claim 15, wherein when the keyword in the plurality of keywords is found in the one or more databases, the instructions, when executed by the processor, further cause the processor to highlight the keyword with a third color to indicate that the keyword already exists.

17. The system of claim 10, wherein the instructions, when executed by the processor, further cause the processor to store the tagged keyword in the corresponding database.

18. A non-transitory computer readable medium having stored thereon instructions that, when executed by a processor, cause the processor to:
   analyze text data to identify a plurality of keywords;
   determine whether each of the plurality of keywords exists in one or more databases; and
   when a keyword in the plurality of keywords is not found in the one or more databases, tag the keyword with a plurality of characters for storage, the plurality of characters including at least a first character to indicate a start of the tagging, a second character to indicate a corresponding database for storing the keyword, and a third character to indicate an end of the tagging.

19. The non-transitory computer readable medium of claim 18, wherein the instructions, when executed by the processor, further cause the processor to store the tagged keyword in the corresponding database.

20. The non-transitory computer readable medium of claim 18, wherein the plurality of characters includes one or more letters, numbers, punctuation marks, and special symbols found on a keyboard.

\* \* \* \* \*